United States Patent [19]

Freeman et al.

[11] Patent Number: 5,039,465
[45] Date of Patent: Aug. 13, 1991

[54] METHOD AND APPARATUS FOR FORMING FIBER REINFORCED PLASTIC PREFORMS FROM A WET SLURRY

[75] Inventors: Richard B. Freeman, Oxford; Bruce N. Greve, Davisburg, both of Mich.

[73] Assignee: The Budd Company, Troy, Mich.

[21] Appl. No.: 513,836

[22] Filed: Apr. 24, 1990

[51] Int. Cl.⁵ ............................................. D21J 7/00
[52] U.S. Cl. ................................. 264/86; 162/116; 162/224; 162/228; 162/383; 162/388; 162/DIG. 1; 264/128; 264/257; 425/84
[58] Field of Search .................... 264/86, 87, 108, 122, 264/128, 257; 425/84, 85; 162/101, 109, 116, 224, 226, 227, 228, 230, 383, 388, DIG. 1

[56] References Cited

U.S. PATENT DOCUMENTS

| | | |
|---|---|---|
| 1,616,222 | 2/1927 | Harrigan ................. 162/DIG. 1 |
| 1,676,798 | 7/1928 | O'Brien . |
| 2,962,762 | 12/1960 | Hartmann et al. . |
| 3,014,835 | 12/1961 | Feigley et al. ................. 162/154 |
| 3,325,349 | 6/1967 | Reifers ................. 162/383 |
| 3,442,757 | 5/1969 | Williams ................. 162/227 |
| 3,449,207 | 6/1969 | Modersohn ................. 162/411 |
| 4,162,935 | 7/1979 | Kollmann et al. ................. 162/220 |
| 4,204,907 | 5/1980 | Korklan et al. ................. 162/135 |
| 4,460,023 | 7/1984 | Mullaney ................. 139/383 A |
| 4,647,415 | 3/1987 | Schafft ................. 264/86 |
| 4,740,346 | 4/1988 | Freeman ................. 264/258 |
| 4,775,705 | 10/1988 | Parker et al. ................. 523/153 |
| 4,800,054 | 1/1989 | Roestenberg ................. 264/86 |
| 4,812,283 | 3/1989 | Farley et al. ................. 264/518 |
| 4,818,448 | 4/1989 | Wrenn, Jr. et al. ................. 264/29.2 |
| 4,849,147 | 7/1989 | Freeman ................. 264/138 |
| 4,863,771 | 9/1989 | Freeman ................. 428/36.1 |

FOREIGN PATENT DOCUMENTS

| | | |
|---|---|---|
| 587989 | 12/1959 | Canada ................. 162/388 |
| 47-7726 | 3/1972 | Japan ................. 162/388 |

OTHER PUBLICATIONS

Keown et al., "Wet Slurry Process", 9 pages (undated).
Rogers, "Structural Composites: Moving the Dream Closer to Reality", Plastics Technology, Sep. 1989.

*Primary Examiner*—Mary Lynn Theisen
*Attorney, Agent, or Firm*—Harness, Dickey & Pierce

[57] ABSTRACT

A method and apparatus for making fiber reinforced plastic preforms via a wet slurry process. A screen with the desired preform configuration is placed in the bottom of a tank. The tank is then filled with water and chopped fibers to create a slurry. The screen is raised up through the slurry causing fibers to be deposited on the screen in the shape of the preform. The preform is then removed from the screen, placed in a mold and injected with resin to form the desired structure.

10 Claims, 2 Drawing Sheets

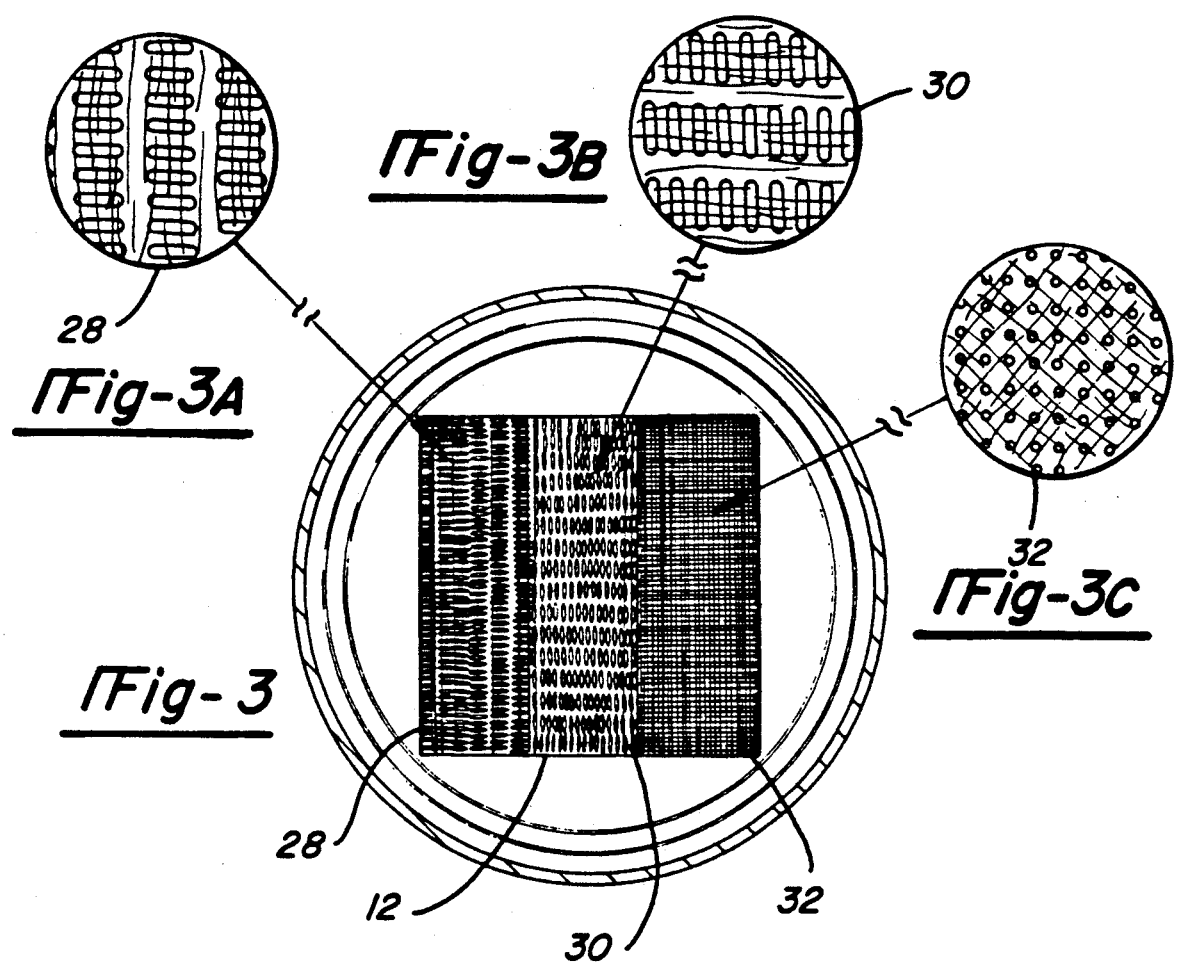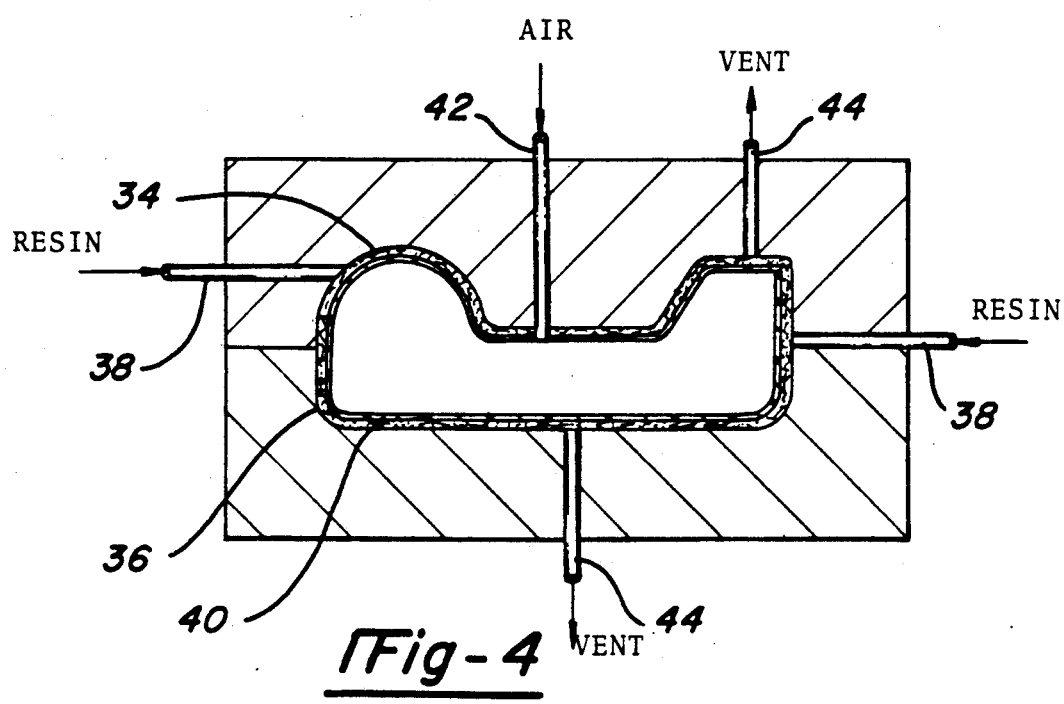

METHOD AND APPARATUS FOR FORMING FIBER REINFORCED PLASTIC PREFORMS FROM A WET SLURRY

BACKGROUND OF THE INVENTION

1. Technical Field

The present invention relates to forming fiber reinforced plastic preforms and, more particularly, to preforms which can be used in a subsequent resin impregnation molding step.

2. Discussion

Fiber reinforced plastic (FRP) parts are presently being used in a wide variety of applications and are finding increased popularity. One method of making FRP parts is known as resin transfer molding (RTM). In RTM, fibrous material in a mold is injected with resin which cures to form the part. In many cases the interior of the part is hollow and is defined by an inflatable member. Examples of these techniques are disclosed in commonly assigned in U.S. Pat. Nos. 4,740,346; 4,849,147 and 4,863,771, as well as U.S. patent applications Ser. No. 257,996 filed Oct. 14, 1988 and U.S. Ser. No. 419,745 filed Oct. 11, 1989.

The impregnated fibrous material is often formed into a preliminary shape before being placed into the mold. These shaped sections generally conform to the shape of adjacent mold die surfaces and are known as preforms. Preforms have been made in several different manners. One approach is to direct chopped fibers onto a screen along with a binder. One problem with this technique is that it is difficult to obtain desired fiber orientation. Another method is to make the preforms from mats of the fibrous material. Unfortunately, a considerable amount of scrap or waste is generated when using the mats which are relatively expensive thereby leading to production cost inefficiencies. Still another technique, known as a wet slurry process, is disclosed, for example, in Keown et al., "Wet Slurry Process Brings Precision to Reinforced Plastics". As disclosed therein, a slurry containing chopped glass strands or fibers is sucked by vacuum into a chamber covered by a screen. As a result, the fibers are deposited on the screen. While this approach is promising, it does have some drawbacks. For example, it appears that it is somewhat difficult to consistently obtain the desired fiber orientation and compactness or density of the fibers using this equipment. In addition, the pumps and other equipment required to create the vacuum and suck the slurry through the screen may be unduly complex and difficult to maintain. Furthermore, the process is relatively slow.

SUMMARY OF THE INVENTION

Pursuant to the present invention a simple, low-cost method and apparatus for forming fiber reinforced plastic preforms is provided. In the method, a screen shaped to the desired preform configuration is placed on a frame at the bottom of a water filled tank. Chopped fibers are then added to the water to create a slurry. The frame and screen are then raised to the top of the tank causing the fibers to be deposited on the screen in the shape of the preform. The preform is then removed from the screen, dried, and placed into a mold. Resin is injected into the mold to impregnate the fibers in the preform and form the desired structure.

In the preferred embodiment, the screen is contoured and contains non-uniform openings of a preselected pattern to promote different, yet controlled fiber orientation in different portions of the preform.

BRIEF DESCRIPTION OF THE DRAWINGS

The various advantages of the present invention will become apparent to one skilled in the art after reading the following specification and by reference to the drawings in which:

FIG. 3 is a top view of the screen and the resulting fiber orientation on different portions of the screen, with FIGS. 3A, 3B and 3C illustrating different screen opening configurations; and FIG. 4 is a side view of a mold using the preforms.

DESCRIPTION OF THE PREFERRED EMBODIMENT

Figure 1:
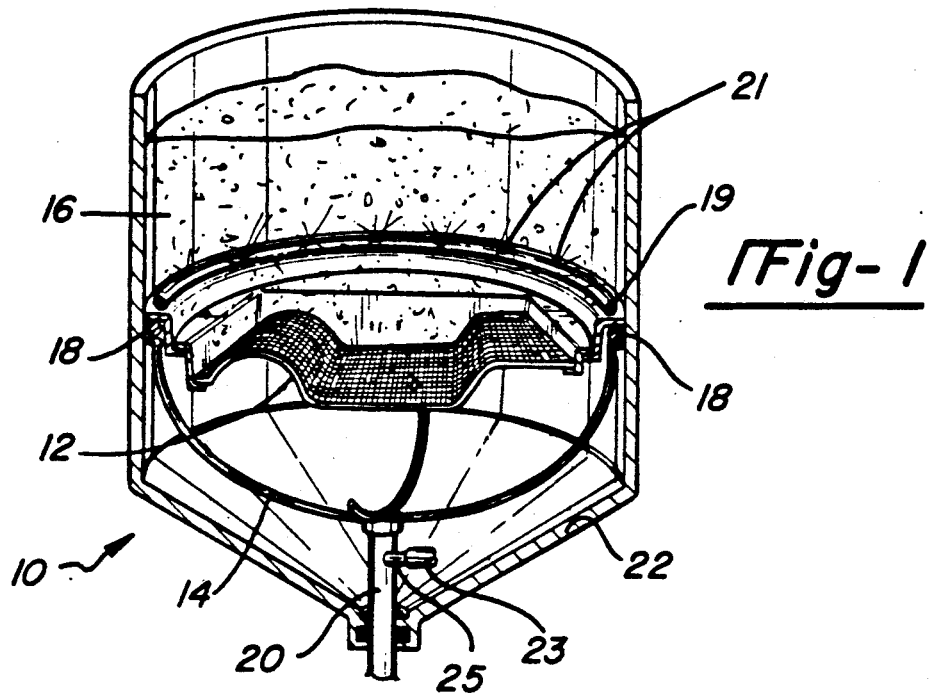
FIG. 1 is a front view of apparatus made in accordance with the teachings of the present invention with the screen positioned at the bottom of the tank.

It should be understood from the outset that the scope of the present invention need not be limited to the particular example used in connection with this invention since those skilled in the art will appreciate that its teachings can be used in a wide variety of applications. With this caveat in mind, the present apparatus 10 for making fiber reinforced plastic preforms from a wet slurry is shown in FIG. and FIG. 2. FIG. 1 shows the apparatus 10 in its starting position. In FIG. 1, a contoured screen 12 containing openings of a preselected pattern has been placed in a frame and lowered to the bottom of a tank 22. The tank 22 is then filled with water and chopped reinforcing fibers such as glass, graphite, polyester or other suitable reinforcing fibers are added to create a slurry 16. A binder is preferably added to the slurry for the purposes of maintaining the shape of the preform after the water is eventually removed during the subsequent drying process that will be discussed later herein. The binder can take various forms and can be a liquid solution added to the slurry or the binder can be pre-applied to the reinforcing fibers. Alternatively, the binder may be fibrils (short fibers) of thermoplastic material which are mixed in with the slurry and will become soft and sufficiently tacky to bind the reinforcing fibers together during the subsequent drying step.

Seals 18 are present between the screen 12 and the tank 22. In the preferred embodiment, the screen 12 and frame 14 are raised to the top of the tank 22 by activating a piston 20 which is attached to the frame 14. Provision is made for mixing the reinforcing fibers, the binder and the water so as to create an evenly distributed dispersion of the constituents. In this embodiment, this is accomplished by way of a bubbler in the form of perforated tubing 19 with a plurality of holes 21 therein. The air is preferably directed vertically upwardly just above the screen 12. Air is advantageously provided to the tubing 19 by way of a hose 23 connected between tubing fitting 29 and a fitting 25 on piston rod 20. Compressed air from source 27 coupled to fitting 31 and routed through the hollow piston rod 20 to fitting 25 and then to bubbler tubing 19 via hose 23 and fitting 29. It should be understood, however, that a variety of other mixing schemes could be used such as cycling the screen 12 up and down to create a surging action.

Figure 2:
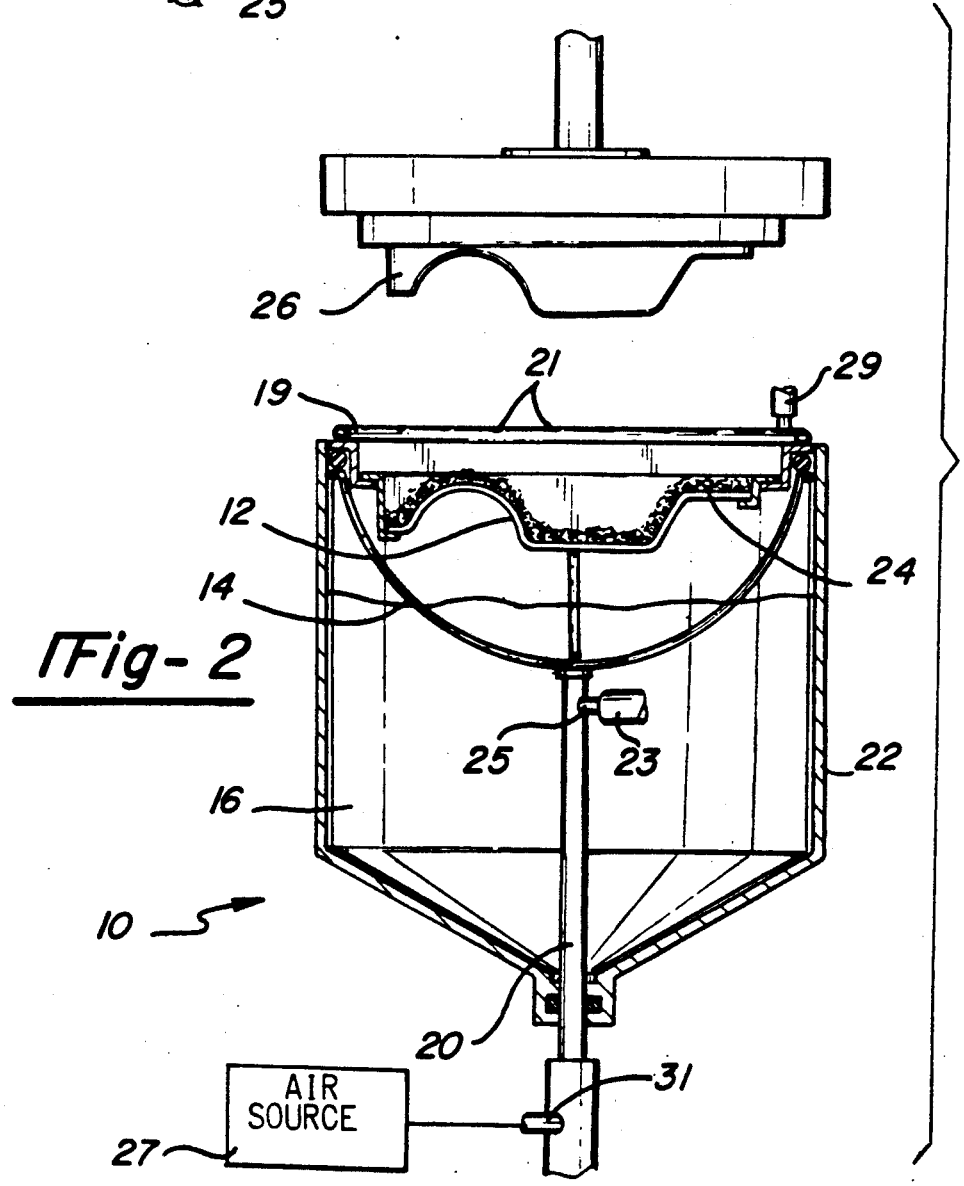
FIG. 2 is a front view of the apparatus after the screen has been raised to the top of the tank.

FIG. 2 shows the present apparatus in its finished position. In FIG. 2, the screen 12 has been pushed up through the slurry 16 to the top of the tank 22 by a piston 20 which is attached to the frame 14. As the screen 12 is pushed to the top of the tank 22, the fibers are deposited on the screen 12 in the shape of the preselected preform 24. The rate of upward travel of the screen can be adjusted by trial and error. The rate should be fast enough to create a vacuum under the sealed screen 12 thereby generating a downward pressure ensuring rapid flow of the liquid through the openings in the screen 12. The rate should not be so fast, however, to collapse or damage the screen.

A vacuum pick-up 26 can be used to remove the preform 24 from the screen 12. Moisture is removed from the preform in any convenient manner. Preferably, the preform is heated for a sufficient time and temperature to evaporate the water and to melt the thermoplastic fibrils to thereby tie the reinforcement fibers together and substantially maintain the shape of the preform 24 as shaped by the screen 12. During the drying process, some compaction may be necessary in order to reduce the thickness of the preform 24 as desired. As an alternative to the vacuum pick-up 26, the preform 24 may be dried while remaining on the screen 12 and then the screen inverted and the preform 24 blown off of the screen.

FIG. 3 shows a top view of a screen 12 with preselected hole patterns 28, 30 and 32. The hole patterns 28, 30 and 32 in the screen 12 are selected to obtain a desired fiber orientation in the preform. For example, hole patterns 28 and 30 represent a screen with parallel slits. Utilizing parallel slits on the screen, the fibers tend to orient themselves generally orthogonally to the major axes of the slits. The uniform matrix of holes 32, on the other hand, promotes random fiber orientation. The size and spacing of the openings will also dictate the relative thickness of the deposited fibers from one section to another on the screen 12 since more of the slurry will tend to pass through larger openings as the screen is raised.

FIG. 4 is a side view of a mold 36 into which two preforms 34a, 34b obtained from the aforementioned process have been placed. The preforms 34a, 34b are placed on an inflatable bladder or other suitable hollow support 40, and then placed into the mold 36. Air or some other suitable gas or medium is applied through conduit 42 into the support 40 to prevent it from collapsing during the subsequent resin injection step.

Once the preforms 34 have been placed in the mold 36, resin is injected through conduits 38 into the preforms 34. Air vents 44 are also provided to permit the escape of air from the preforms 34 to prevent the formation of voids and other undesirable characteristics. After the preforms 34 have been impregnated with the resin and cured, the composite article can then be removed from the mold 36. More details about this process can be obtained by studying the aforementioned commonly assigned U.S. patents and applications which are hereby incorporated by reference.

The present invention provides a simple, low-cost method and apparatus for forming fiber reinforced preforms which allows preforms of any shape to be made quickly by a process that is easy to control and equipment that is more economic to build and/or maintain. The preform formed from this process should have more controlled orientation than preforms formed by the known methods.

What is claimed is:

1. A method of forming a structure from a fiber reinforced plastic preform which comprises:
   (a) placing a screen shaped to a desired preform configuration near the bottom of a tank filled with a liquid, said screen having a preselected geometry of openings with hole patterns of non-uniform size, shape and orientation;
   (b) adding reinforcing fibers to the liquid to create a slurry;
   (c) raising the screen to the top of the tank causing the fibers to be deposited on the screen thereby generating a preform, said preselected geometry or openings in the screen causing the fibers to be deposited in preselected orientations related to the orientation of the holes in the screen;
   (d) removing the preform from the screen;
   (e) placing the preform in a mold;
   (f) injecting resin into the mold to impregnate the fibers in the preform to thereby form the desired structure; and
   (g) removing the structure from the mold.

2. The method of claim 1 wherein the preselected geometry of openings in the screen comprises a first region of elongated slots lying in a given direction and at least one more region of elongated slots lying in a different direction relative to the given direction of the first region.

3. The method of claim 1 which further comprises the step of: removing the preform from the screen by a vacuum pickup device.

4. The method of claim 1 which further comprises the step of: using a bubbler to mix the liquid and fibers together to create a substantially even dispersion of fibers in the slurry.

5. An apparatus for forming fiber reinforced plastic preforms comprising:
   (a) a tank having a top portion and a bottom portion, the tank containing a slurry of liquid and a mass of fibers;
   (b) a contoured screen having a predetermined configuration, said contoured screen containing openings and being disposed within said tank;
   (c) frame means for supporting the screen;
   (d) means for raising the contoured screen vertically toward the top portion of the tank at a sufficient rate to create a downward force which causes the slurry of liquid to pass through the openings in the screen whereby the fibers are deposited on the screen to form a preform having substantially the same configuration as the contoured screen and having a sufficient mass of fibers to form a fiber reinforced plastic part when injected with resin; and
   (e) vacuum pickup means for removing the preform from the screen, the pickup means having an engagement surface complimentary to the contoured screen.

6. The apparatus of claim 5 further comprising: bubbler means located adjacent to the screen for mixing the liquid and fibers together to create a substantially even dispersion of the fibers in the slurry, said bubbler means including a perforated tubing; an air source; and an air passageway from the source to the perforated tubing, with part of said passageway including a hollow space in a piston for raising the screen.

7. The apparatus for forming fiber reinforced plastic preforms comprising:

(a) a tank containing a slurry of liquid and fibers;
(b) a screen having a preselected geometry of openings with hole patterns of non-uniform size, shape and orientation;
(c) frame means for supporting the screen; and
(d) means for causing the slurry to flow through the screen and deposit the fibers on the screen, said preselected geometry of openings in the screen causing the fibers to be deposited in preselected orientations related to the orientation of the holes in the screen.

8. The apparatus of claim 7 wherein the preselected geometry of openings in the screen comprises a first region of elongated slots lying in a given direction and at least one more region of elongated slots lying in a different direction relative to the given direction of the first region.

9. An apparatus for forming fiber reinforced plastic preforms comprising:
(a) a tank containing a slurry of liquid and fibers;
(b) a screen;
(c) frame means for supporting the screen;
(d) means for raising the screen to cause the fibers to be deposited on the screen; and
(e) bubbler means located adjacent to and carried with the screen for mixing the liquid and fibers together to create a substantially even dispersion of the fibers in the slurry.

10. The apparatus of claim 9 where said bubbler means comprises: a perforated tubing carried by the frame means:
(a) an air source; and
(b) an air passageway from the air source to the tubing, with part of said passageway being through the means for raising the screen.

* * * * *